| UPPER SURFACE | | LOWER SURFACE | |
|---|---|---|---|
| STATION | ORDINATE | STATION | ORDINATE |
| 0 | 0 | 0 | 0 |
| .435 | .4914 | .565 | −.4314 |
| .678 | .5994 | .822 | −.5154 |
| 1.169 | .7638 | 1.331 | −.6354 |
| 2.408 | 1.0542 | 2.592 | −.8310 |
| 4.898 | 1.4946 | 5.102 | −1.1154 |
| 7.394 | 1.8414 | 7.606 | −1.3326 |
| 9.894 | 1.1330 | 10.106 | −1.5126 |
| 14.899 | 2.6028 | 15.101 | −1.7952 |
| 19.909 | 2.9628 | 20.091 | −2.0076 |
| 24.921 | 3.3282 | 25.079 | −2.1642 |
| 29.936 | 3.4392 | 30.064 | −2.2728 |
| 34.951 | 3.5724 | 35.049 | −2.3364 |
| 39.968 | 3.6402 | 40.032 | −2.3550 |
| 44.980 | 3.6348 | 45.016 | −2.3208 |
| 50.00 | 3.5490 | 50.00 | −2.2254 |
| 55.014 | 3.3750 | 54.986 | −2.0610 |
| 60.027 | 3.1302 | 59.973 | −1.8450 |
| 65.036 | 2.8272 | 64.964 | −1.5011 |
| 70.043 | 2.4768 | 69.957 | −1.3994 |
| 75.045 | 2.0874 | 74.955 | −1.1784 |
| 80.044 | 1.6698 | 79.956 | −.9216 |
| 85.038 | 1.2342 | 84.962 | −.6996 |
| 90.028 | .8490 | 89.972 | −.4858 |
| 95.014 | .4481 | 94.986 | −.2160 |
| 100.00 | .0000 | 100.00 | .0000 |

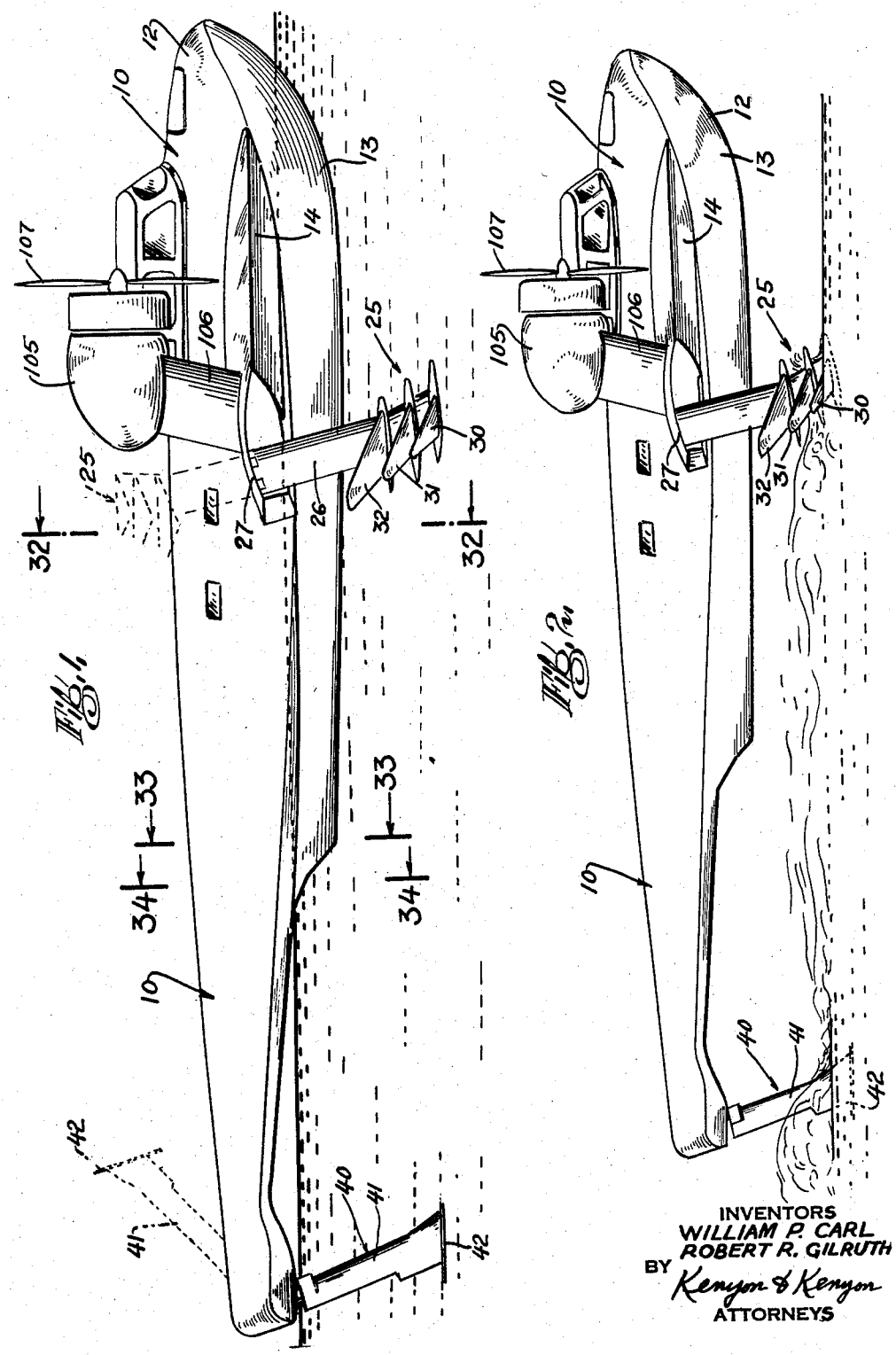

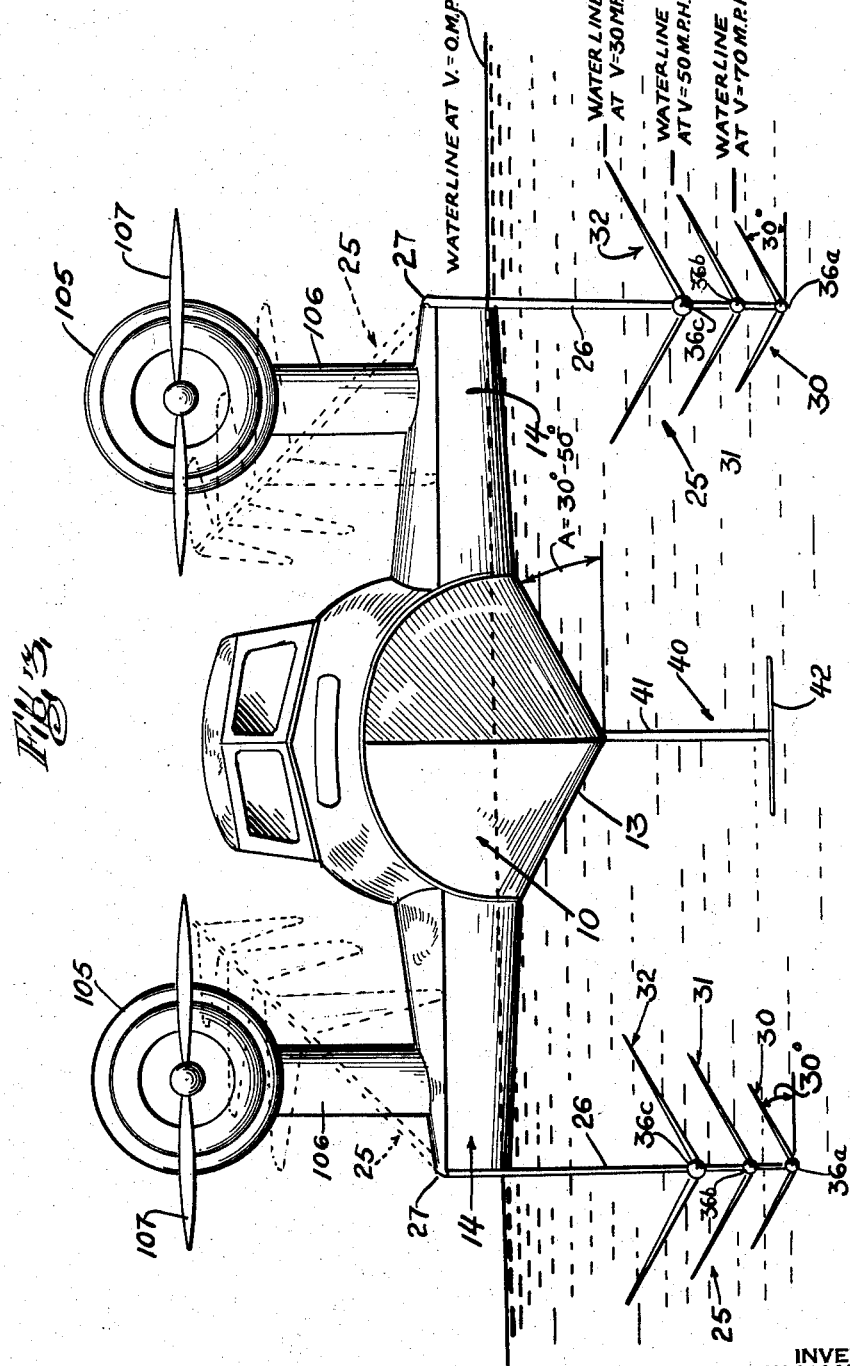

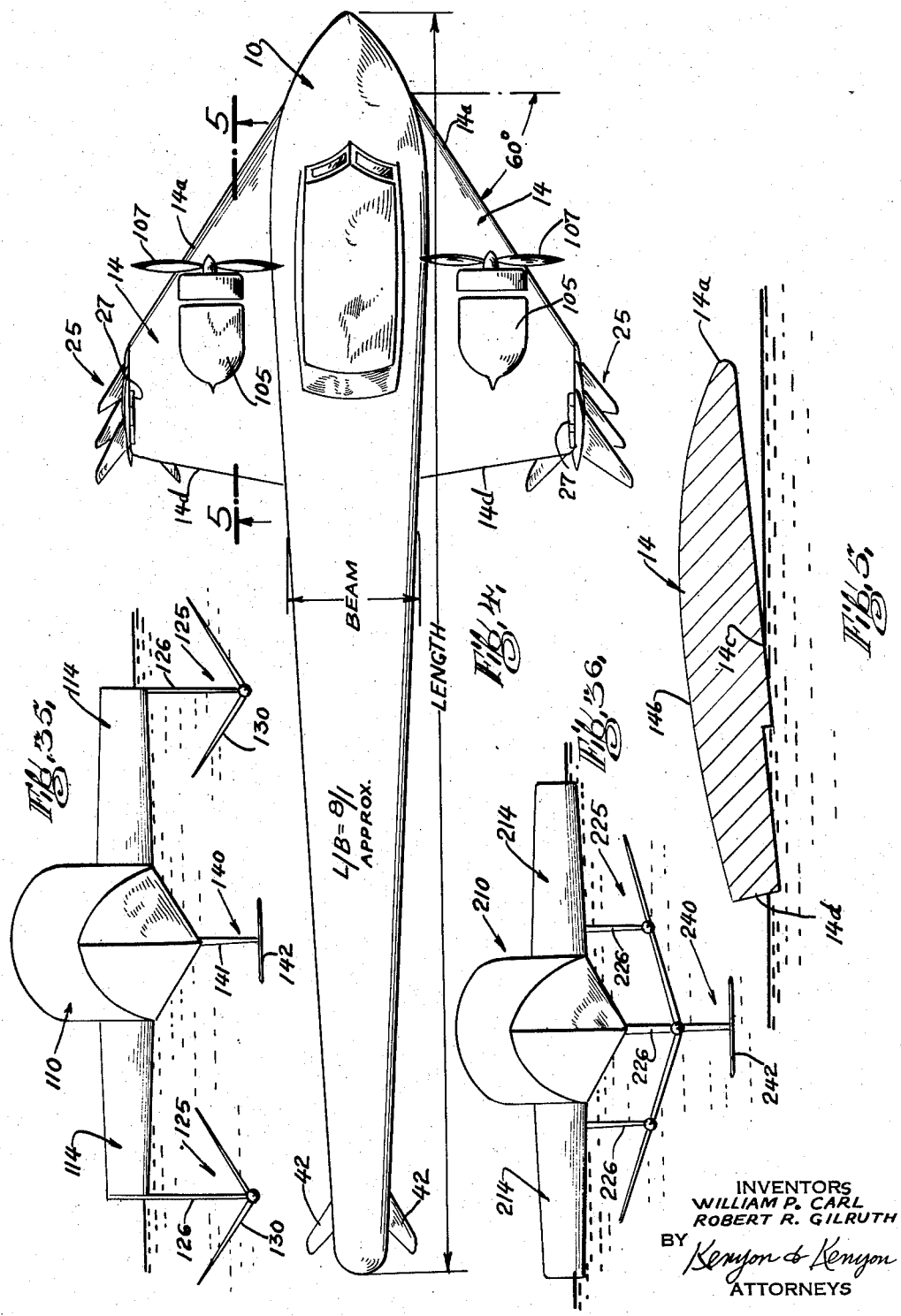

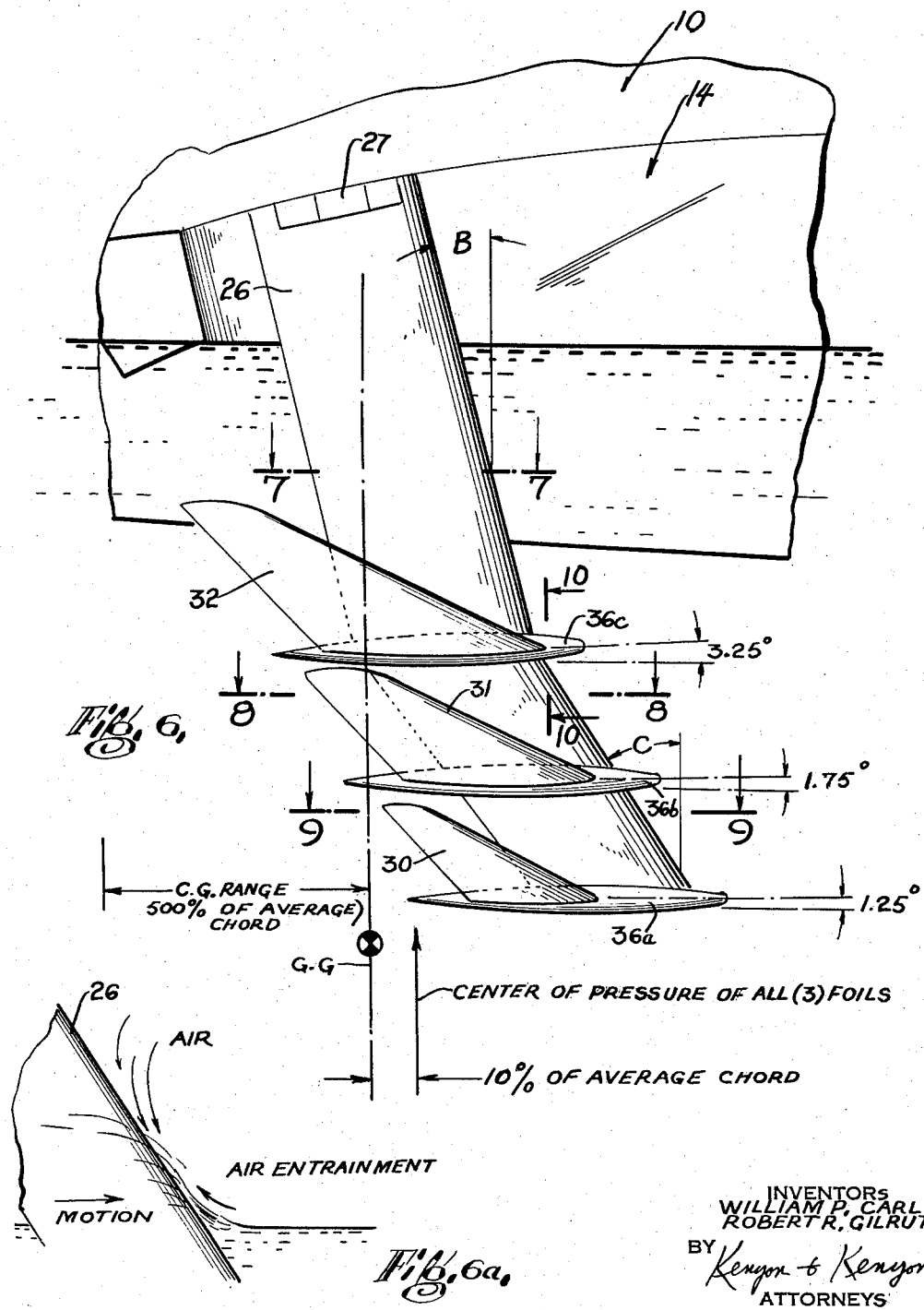

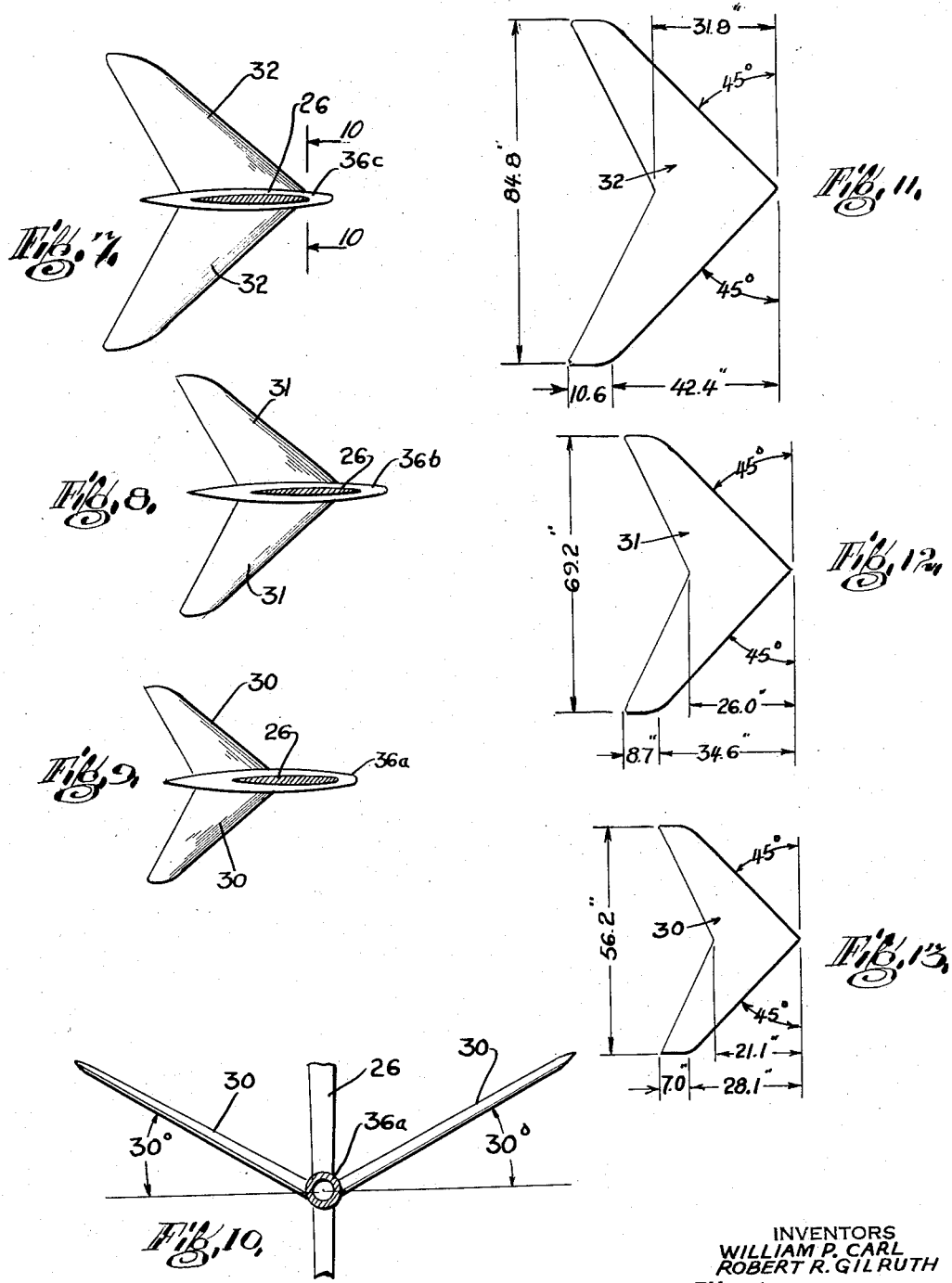

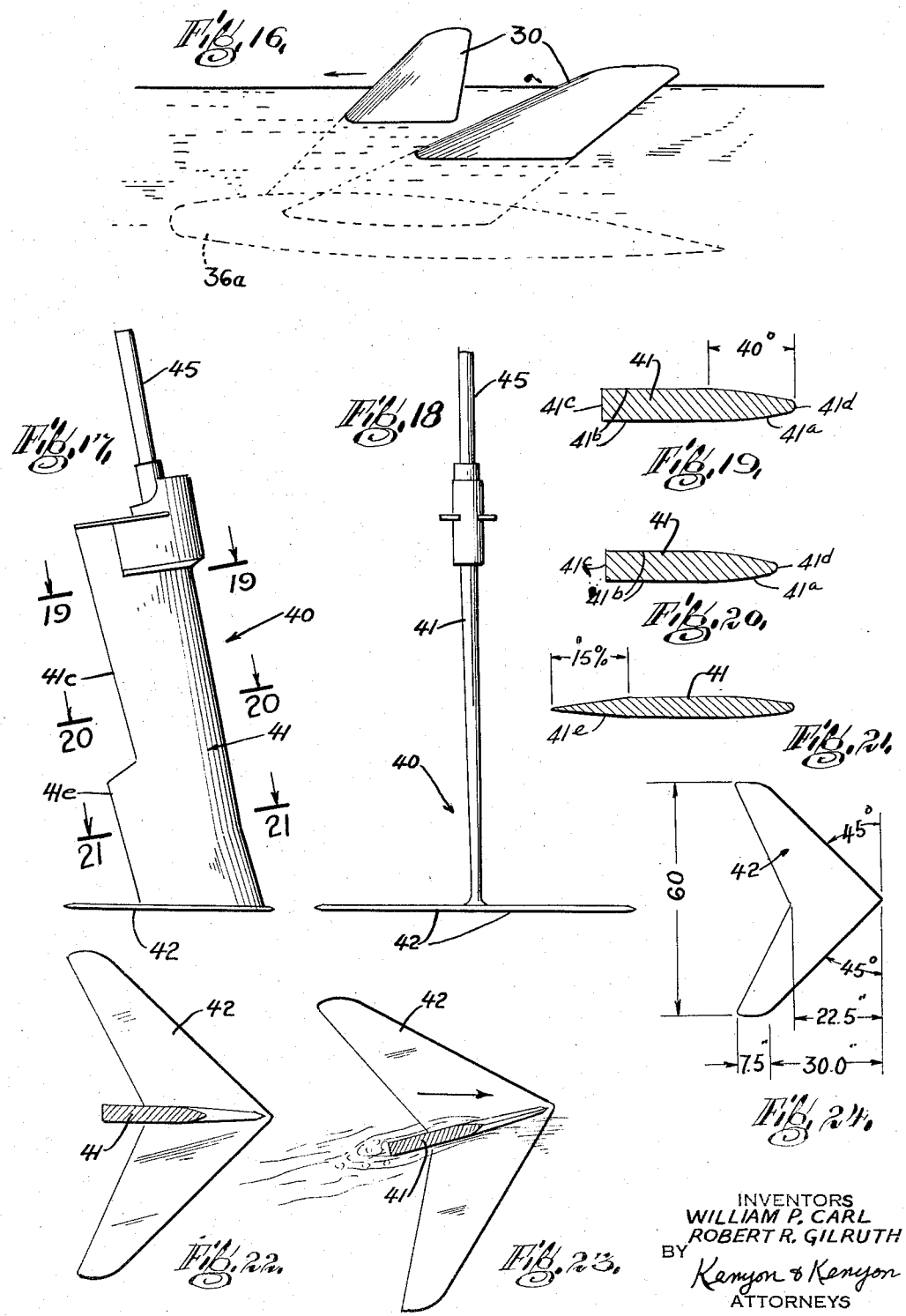

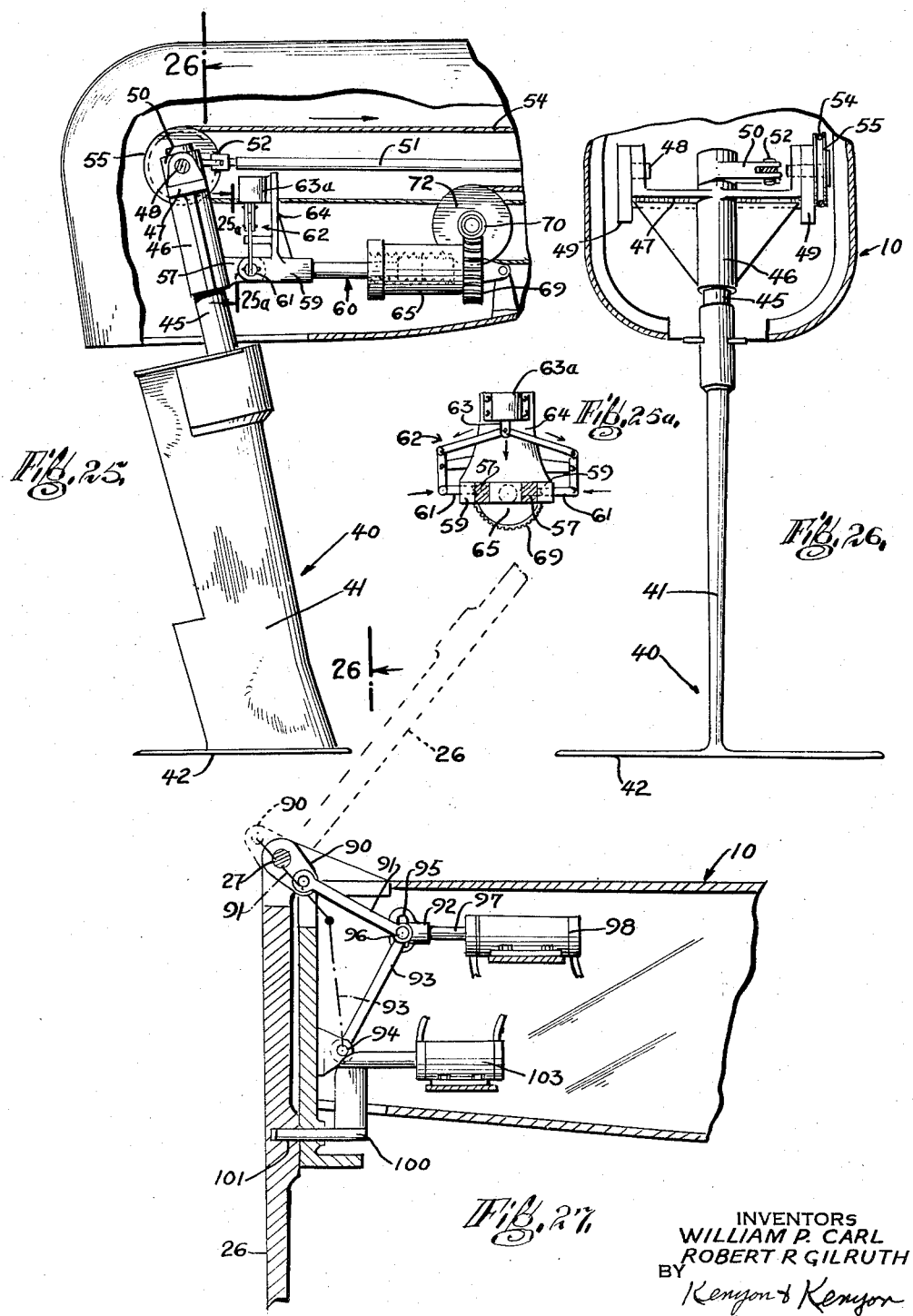

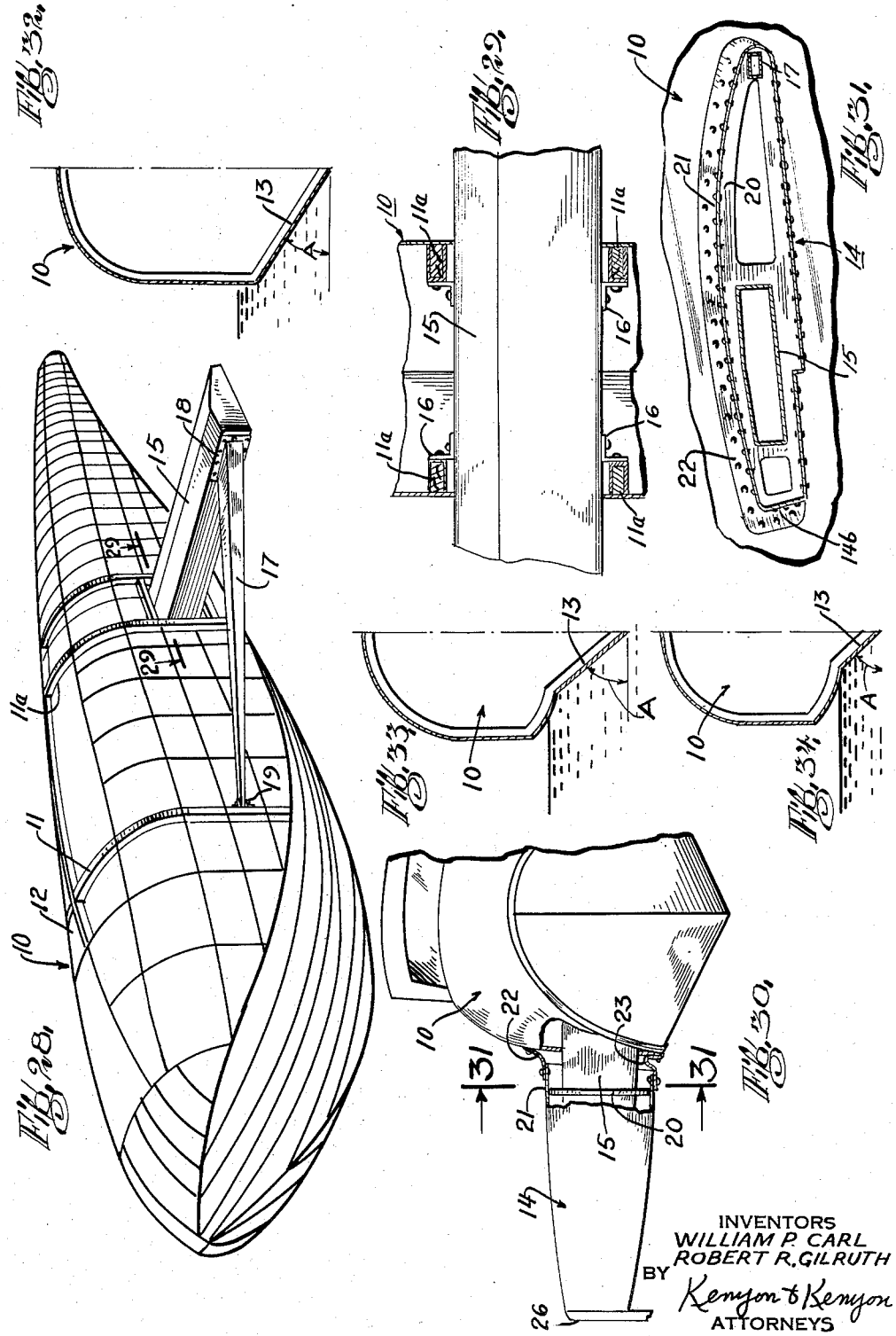

Nov. 24, 1959  W. P. CARL ET AL  2,914,014
HYDROFOIL CRAFT
Filed Aug. 15, 1955  10 Sheets-Sheet 10

MAIN STRUT

THE LEADING EDGES OF STRUTS ARE EXTENDED
TO A POINT 5% AHEAD OF THE ORIGINAL CHORD DESCRIBED
ABOVE. THIS POINT IS CONNECTED BY TANGENTS
TO PROFILE AT THE ORDINATES OF THE 5% STATIONS
OF THE ORIGINAL CHORD

| STATION | ORDINATE |
|---|---|
| 0 | 0 |
| .50 | .7778 |
| .75 | .9445 |
| 1.25 | 1.1807 |
| 2.50 | 1.5835 |
| 5.00 | 2.1807 |
| 7.50 | 2.6530 |
| 10.00 | 3.0419 |
| 15.00 | 3.6670 |
| 20.00 | 4.1392 |
| 25.00 | 4.5004 |
| 30.00 | 4.7504 |
| 35.00 | 4.9171 |
| 40.00 | 5.0004 |
| 45.00 | 4.9726 |
| 50.00 | 4.8198 |
| 55.00 | 4.5420 |
| 60.00 | 4.1531 |
| 65.00 | 3.6947 |
| 70.00 | 3.1669 |
| 75.00 | 2.6200 |
| 80.00 | 2.1002 |
| 85.00 | 1.6029 |
| 90.00 | 1.0695 |
| 95.00 | .5156 |
| 100.00 | .0000 |

INVENTORS
WILLIAM P. CARL
ROBERT R. GILRUTH
BY Kenyon & Kenyon
ATTORNEYS

United States Patent Office 2,914,014
Patented Nov. 24, 1959

2,914,014

HYDROFOIL CRAFT

William P. Carl, Islip, N.Y., and Robert R. Gilruth, Seaford, Va., assignors to Dynamic Developments, Inc., Islip, N.Y., a corporation of New York Application August 15, 1955, Serial No. 528,158

17 Claims. (Cl. 114—66.5)

This invention relates to improvements in water-borne craft, sometimes called hydrofoil craft. It particularly relates to water-borne craft of this type designed for stable speed operation in rough or calm seas.

Objects and features of this invention are the provision of structural arrangements of such water-borne craft including the provision of hydrofoil systems in association therewith of such nature and character as to enable the craft so equipped to travel through rough water at speeds of upwards of 70 miles per hour, and which is statically and dynamically stable about all three axes.

We are aware of the fact that prior workers have directed efforts toward designing of stable craft intended to develop high speeds in rough seas. Insofar as we are aware, however, these workers have not succeeded in solving the inherent design problems nor have they achieved speeds or stability comparable with the speeds and stability of the craft constituting the subject matter of the instant invention.

In connection with any hydrofoil type of water-borne craft, the purpose of the hydrofoil systems is to reduce the wetted area of the hull at increasing speed and to maintain the hull entirely or partially clear of waves when the craft is operating in rough water. This is done in order to make it possible for the craft to operate at high speeds in smooth and in rough water with a reasonable propulsion power applied. In so raising the hull clear when operating over rough water, it is necessary that the loads imparted to the hull bottom do not become so great as to require so much strength that no available weight is left for the payload.

The term "hydrofoil" as employed herein refers to an airfoil-shaped section adapted to operate in water and which, by virtue of such airfoil shape, is conformed to produce lift by increasing the pressure on the lower side of the section and decreasing the pressure on the top side of the section as a result of forward movement in the liquid medium.

Further objects and features of this invention are a solution for the problem of providing high speed craft of the type herein mentioned by providing a unique and interdependent combination of proportions, critical angles, shapes and distribution of the weights and forces involved for the production of a hydrofoil craft which has unprecedented performance characteristics in both smooth and rough water and when operating in any direction to the wind and sea. It is understood, of course, that certain deviations and departures may be made from the exact angles, shapes, proportions and distribution of weights and forces in connection with the craft of this invention. But very definite limitations to the amount or range of deviations have been empirically determined by exhaustive experimentation and these ranges of deviations constitute part of the invention herein involved.

Other objects and features of the invention include the provision of novel main supporting foil system as well as novel tail foil system for the craft involved.

Further objects and features of the invention include the provision in the craft of a main supporting foil system which is reefing or surface-piercing in principle, in combination with a stabilizing foil system which is intended to operate completely submerged. The expressions "reefing" or "surface-piercing" in principle are defined in greater detail hereinafter and an alternative term proposed therefor.

Additional objects and features of the invention are the arrangement of foil systems with critical dimensional characteristics and shapes required to produce static and dynamic stability for the craft on all three axes.

Further objects and features of the invention are the provision of foil systems in combination with the hull wherein the components of the foil systems are retractable relative to the hull to permit operation in shallow water and also to provide access to the components of the foil systems for repair, adjustment or replacement.

Further objects and features of the invention are the provision of a stabilizing or tail foil system which can be utilized both to provide directional control and to provide trim control for the hull for trimming out moments due either to air or water propulsion systems for the craft or of changes of center of gravity of the craft.

Other objects and features of the invention are the provision in the craft of this invention of a hull of large length to beam ratio with large deadrise angles and wherein lateral stability is provided by sequifoils attached to each side of the hull, the sequifoils being planing units providing only positive pressures.

Further objects and features of the invention are the provision of a combined hull and foil system in which the vertical loads and some of the torsional loads are taken by a beam running transversely through the hull, the fairing over the beam being attached to the hull in shear only so that it can go up and down without imparting loads to the hull but will develop its strength in torsion.

Other objects and features of the invention are the provision of hull and foil system constructions adapted by their shapes, dimensions and interarrangement to reduce to a minimum the drag to forward motion at high speeds.

Further objects and features of the invention are to provide craft of the character described that is safe and easy to manipulate even in rough water at extremely high speeds.

Other objects and features of the invention will become apparent from the following specification and accompanying drawings, wherein:

Fig. 1 is an outboard side profile view of the craft at rest in the water;

Fig. 2 is an outboard side profile view of the craft in high speed motion illustrating the elevation of the hull above the water surface with the reefing effect on the main supporting foils and further illustrating the submerged position of the stabilizing foil even at such time;

Fig. 3 is an outboard profile front view of the craft of Fig. 1;

Fig. 4 is a top plan view of the craft of Fig. 1;

Fig. 5 is a diagrammatic section taken along line 5—5 of Fig. 4 and illustrative generally of the profile of the sequifoils;

Fig. 6 is an elevational view of one of the main supporting foil systems in relationship to its attachment to one of the sequifoils;

Fig. 6a illustrates diagrammatically the action of water and air on one of the main supporting foil system struts;

Figures 14, 15:
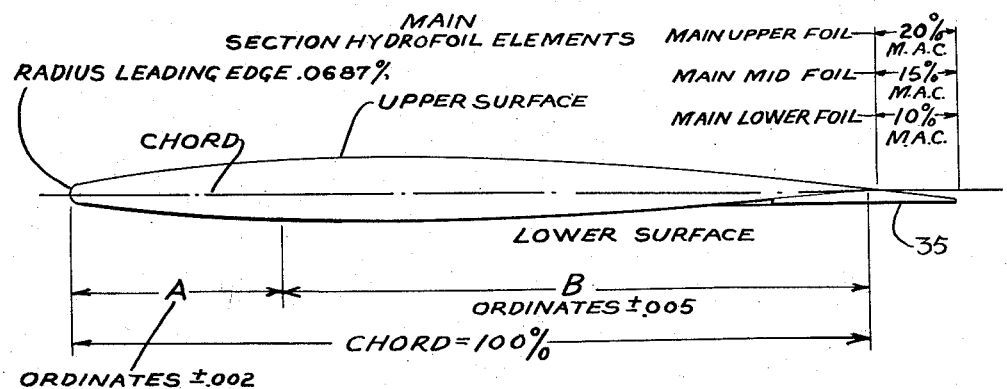
Figures 37, 38:
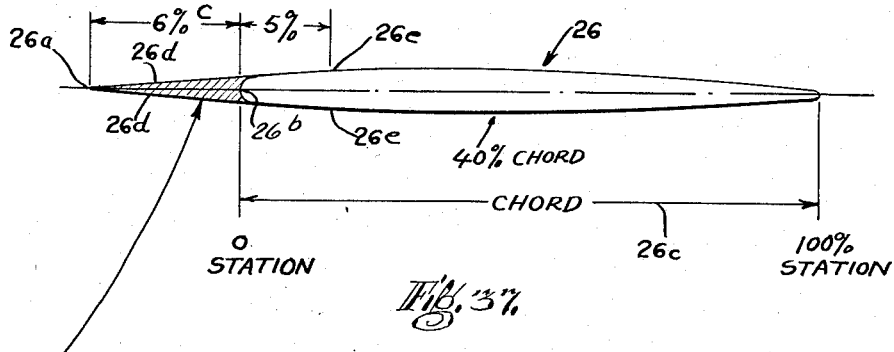

Figs. 7, 8 and 9 are, respectively, views taken along the lines 7—7, 8—8 and 9—9 of Fig. 6, being illustrative of the changes in section of the main supporting foil system strut, from the point of its attachment to the sequifoil toward its outermost or lower end;

Fig. 10 is a fragmentary front elevational view of one of the hydrofoil elements associated with the main strut of Fig. 6, such view showing a section along line 10—10 of such Fig. 6 and of Fig. 7 also;

Figs. 11, 12 and 13, respectively, are development plan views of the uppermost, central and lower hydrofoil elements of the system associated with the main strut of Fig. 6;

Fig. 14 is a diagrammatic section illustrative of the longitudinal sectional shape of each of the hydrofoil elements associated with the main strut of Fig. 6;

Fig. 15 in tabular form lists the stations and ordinates in percent of the chord length for any chord, which provides the values necessary to arrive at the hydrofoil element section shown in Fig. 14;

Fig. 16 illustrates diagrammatically the reefing action of the main supporting hydrofoils;

Fig. 17 is a side elevation of the tail strut and of the stabilizing foil system associated therewith;

Fig. 18 is a front elevation of the tail strut and stabilizing foil system associated therewith;

Figs. 19, 20 and 21 are successively transverse sections of the tail strut taken, respectively, along the lines 19—19, 20—20, 21—21 of Fig. 17;

Fig. 22 is a fragmentary plan view of the stabilizing foil system in a so-called neutral or non-steering position when it is intended that the direction of the craft be directly forward;

Fig. 23 is a similar view illustrating the position of the tail strut and its stabilizing foil when rotated out of the neutral position into a steering position of the moving craft; the figure further illustrating diagrammatically how the cross-sectional shape of the tail strut eliminates flow separation;

Fig. 24 is a plan view of the stabilizing foil element with dimensional notations;

Fig. 25 is a fragmentary partially sectionalized and partially diagrammatic tail side elevation illustrating the control mechanism for retracting the tail foil, for adjusting it to provide for trim control and for rotating it about a vertical axis to provide directional control for the craft;

Fig. 25a is a view taken along line 25a—25a of Fig. 25;

Fig. 26 is a sectional view taken along line 26—26 of Fig. 25, illustrating further details of the construction of Fig. 25;

Fig. 27 is a fragmentary longitudinal sectional view of one of the sequifoils, including diagrammatically mechanism for moving the main foil system struts into raised or retracted position;

Fig. 28 is a diagrammatic perspective view of a hull equipped with the transverse beam and auxiliary leading edge beams intended to absorb the vertical inertia loads of the power plants and main supporting foil system as well as the static and dynamic vertical loads imposed by the main foil system during operation of the craft;

Fig. 29 is a fragmentary view taken along line 29—29 of Fig. 28 and illustrative of the manner of attachment of the transverse beam to the hull framing;

Fig. 30 is a fragmentary front elevation partially broken away and illustrative of the attachment of the fairing between the sequifoil and the hull in shear only so that the foil can go up and down without imparting loads to the hull but develop its strength under torsion;

Fig. 31 is a longitudinal section taken along line 31—31 of Fig. 30 and illustrative of the manner of attachment of the said sequifoil fairing to the hull;

Fig. 32 is a transverse sectional view of the hull taken along line 32—32 of Fig. 1;

Fig. 33 is a similar transverse section of the hull taken along line 33—33 of Fig. 1;

Fig. 34 is a similar semi-transverse section taken along line 34—34 of Fig. 1;

Fig. 35 (Sheet 3) is a diagrammatic front elevational view of a modified main foil system for use in conjunction with the hull and tail foil system of Fig. 1;

Fig. 36 is a similar view of a further modified form of main foil construction intended for use in conjunction with the hull and tail foil system of Fig. 1;

Fig. 37 is a diagrammatic sectional view of one of the main supporting foil struts; and Fig. 38 is a tabular listing of the ordinates of each main foil strut in percentage relative to its chord to provide the desired main strut section. Since the section is symmetrical relative to the strut chord the ordinates only to one side of the chord at different stations all in percent of chord are listed.

*General construction*

The craft which is the subject-matter of the instant invention includes a streamlined hull of length to beam ratio of approximately 8. This hull has a bottom which has high deadrise angles throughout, the minimum of such angles being of the order of 30° and ranging up to approximately 50°. The hull is equipped in its forward section with short stub-like laterally extending wings commonly known as sequifoils. These sequifoils, in addition to their usual function of preventing the long slender hull from rolling over when the craft is at rest in the water, also have additional functions. Among their functions, in the particular form shown, they act as supports for the propulsion system of the craft which, illustratively, comprises air screws driven by appropriate aircraft engines. In addition, the sequifoils serve as supports for the main supporting hydrofoil system of the craft. The latter are carried in a retractable manner at the outer ends of the sequifoils. Appropriate mechanism is included and preferably located within the sequifoils to move the main hydrofoil systems either into their downwardly extending running positions for operation or into a retracted position above the sequifoils. The sequifoils also may serve as fuel storage space.

The tail portion of the hull carries a stabilizing foil system which is adapted to provide both trim and directional control for the craft. The stabilizing foil system is retractable preferably about an axis transverse to the longitudinal axis of the hull of the craft.

The main supporting foil system is provided with hydrofoils which are of the reefing or surface-piercing type in principle, it being intended that when the craft operates at high speed that at least a part of the total surface area of the main supporting hydrofoils will rise above the water level. The stabilizing foil system which is located at the tail or aft portion of the hull is intended always to run submerged during operation of the craft. The expression "reefing" as employed herein finds its analogue in the art of sailing wherein it refers to the reduction in area of a sail presented to the wind. A reefed sail is one which has been partially secured in a furled condition thereby to present a less area to the wind. As used herein, the area of the foil surfaces presented to the water is reduced gradually by emergence of the foils gradually as the speed increases. Thus the expressions "reefing" or "reefing in principle" or "surface-piercing" as applied herein to hydrofoils, refer to the character or construction of a hydrofoil or hydrofoil system which enables it progressively to emerge from the water as the forward speed progressively increases. This provides a desired reduction in area of hydrofoil presented to the water, such reduction (and such reefing) being in response to and thus a function of the increase of speed, the converse also being true. Normally, even at high speeds, the emergence of an entire foil system will not be complete since some of its surface will remain submerged for supporting the load. The reefing character of the main hydrofoil system, in the form shown, is brought about by the shape and angular disposition of the struts and foil elements, with particular reference to the angle of dihedral and to the angle of incidence of the foils.

In lieu of the expressions "reefing" or "surface piercing" in principle there may be employed the expression "area stabilizing." These three expressions, "reefing," "surface piercing" and "area stabilizing" all refer to a common characteristic of the main hydrofoil system as explained in the preceding paragraph.

Hull construction

Referring to the drawings and first to Figs. 1 to 4 inclusive, and to Figs. 28, 32, 33 and 34, the reference character 10 denotes generally a streamlined hull which is constructed of framework 11 (Fig. 28) and covered externally with a stressed skin 12 in convenient ways. The stressed skin may be of mahogany plywood, other woods or of any suitable material such as sheet metal.

In a presently preferred construction the hull lines are a series of conics so that the stressed skin 12 of mahogany plywood can be applied cold. The hull frame is made of mahogany keel, chines and main longerons; spruce stringers; mahogany plywood frame elements with spruce flanges (all not shown in detail herein) and the entire framework of these components is covered with the stressed skin 12 in this instance of mahogany plywood. It is to be understood that the structural details of the hull 10 may be altered in any desirable way consonant with good naval engineering practice to provide the contour or configuration herein shown and described.

The hull 10, as is clear, is relatively long with respect to its beam or width and in practice has a length to beam ratio of approximately 8. As will be observed particularly from Figs. 3, 32, 33 and 34, the hull bottom 13 has high deadrise angles A throughout its length. By preference, minimum deadrise angle A (Fig. 3) is approximately 30° and may range as high as approximately 50°. The high deadrise angles A are preferable for the purposes of minimizing drag of the hull when it hits waves while traveling at high speeds. The drag is minimized because the hull bottom knifes through the water rather than plowing through it. In addition, the deadrise angles A also act to minimize loads on the hull bottom 13 when the latter strikes a wave crest while traveling at high speed.

Sequifoils

Sequifoils 14 are provided of identical construction which are located well forward of the hull 10. These sequifoils 14 are in effect short stub-like wings. They serve to prevent the hull 10 from rolling over when at rest in the water. They extend laterally from opposite sides of the hull 10 above its usual waterline.

In plan, as seen in Fig. 4, the sequifoils 14 taper in an outward direction away from the hull with their outer ends having the smallest dimension. The leading edges 14a of these sequifoils are disposed at a large sweep back angle of the order of approximately 60°. In section, as will be observed from Fig. 5, the upper surfaces 14b of the sequifoils are streamlined while their lower buttock surfaces 14c are substantially free of curvature. The purpose of eliminating curvature from such lower surfaces is to eliminate suction forces which would occur with curved streamline surfaces in contact with the water during the forward motion. The trailing edge 14d of each sequifoil is blunt. The outer covering of the sequifoils 14 is also a stressed skin. This stressed skin is of any conventional material, for example, of mahogany plywood, or metal or other suitable material.

In constructing or assembling the sequifoils 14 with the hull, a transversely extending box beam 15 (Fig. 28) preferably of aluminum or other light weight material is provided. This beam 15 extends transversely through the framework 11 of the hull near the desired location of the trailing edges 14d of the two sequifoils 14. This box beam 15 is symmetrically disposed relative to the hull and extends outwardly on each side of the latter to approximately the desired length of the respective sequifoils 14. The box beam 15 is secured to the frame parts 11a of the hull as by angle brackets 16 riveted, for example, to the box beam 15 and secured by screws or bolts to such frame parts 11a which may be of wood. The beam 15 is subdivided into compartments (not shown) and, if desired, can be constructed to carry fuel internally.

In addition, as seen in Fig. 28, a leading edge beam 17 is fixedly secured at 18 adjacent to each outer end of the box beam 15. Each leading edge beam 17 is pivotally secured at 19 to the hull frame 11 at its appropriate side. Each leading edge beam 17 has approximately the sweepback angle relative to the hull which is desired for the leading edge of its associated sequifoil 14, namely, approximately 60°.

Longitudinally extending ribs 20 (Fig. 31) having the general profile seen in that figure, are carried by the box beam 15 and by the leading edge beams 17. These ribs 20 are of conventional construction and their particular structural detail is not shown. If of metal, their weight may be reduced in the usual way by the provision of appropriate voids. The ribs 20 are covered with the stressed skin of the sequifoil 14 and when so covered provide the streamline shape for the upper surface 14b of each sequifoil 14 and the uncurved or planing portion in the lower buttock portion 14c of each sequifoil as well as a blunt trailing edge 14d therefor.

In addition, portion 21 of fairing or stressed skin or surface covering for each sequifoil, as indicated in Fig. 30, is attached to the hull at 22 and 23 in shear only. This type of connection is provided so that the fairing of the sequifoils is free to move vertically up and down relative to the hull without imparting material loads to it but which will develop its strength in torsion. In other words, the shear web attachment of the fairing of the sequifoils as indicated at 22 and 23 of Figs. 30 and 31 avoids undue stresses or strains on the hull 10 such as those that would be introduced without such connection when incidental load caused vertical movements of the sequifoil fairings or covering occurred. The sequifoils 14 shaped and supported as described are planing units providing only positive pressures.

Main supporting hydrofoil system

The sequifoils 14 and outer ends of the box beam 15 thereof serve to carry and to support main supporting foil systems for the craft each denoted generally by the reference character 25 (Figs. 1, 2, 3 and 6–14 inclusive). In the preferred embodiment shown in these figures, one main supporting foil system 25 is supported by the box beam 15 at the outer end of each sequifoil 14. Inasmuch as the strutcure of each main supporting foil system 25 as well as the manner of its support from an end of beam 15 is identical, only one of the main supporting foil systems 25 will be described specifically.

Each main supporting foil system 25 in the preferred embodiment of the invention comprises a main strut 26. This main strut 26 is cantilevered in a hinged manner at 27 from an outer extremity of the box beam 15. For reasons which will presently appear, the axis of the hinge support at 27 extends at an angle of 20° to a horizontal plane containing the longitudinal horizontal axis of the hull 10. This angle may vary. The hinged support at 27 may be of any conventional kind, for example, a hinged coupling whose interengaging parts are disposed at the outer end of the box beam 15 and at the upper end of the main supporting strut 26.

As will be observed from Figs. 1, 2 and 6, the longitudinal axis of the main supporting strut 26 sweeps forwardly as it extends downwardly. The angle B of forward sweep is more than 0° and preferably not more than 20° to the vertical. It is to be noted that the lower portion of the strut 26 has a greater angle C of forward sweep than angle B of its upper portion. Angle C may range from 0° to approximately 35° to the vertical. The transverse section of each strut 26 as seen in Figs. 7, 8 and 9 is basically a streamline shape. Each strut, moreover, tapers or thins down toward its lower extremity. This is apparent from Fig. 3 and from a comparison of the thicknesses of the sections of the strut 26 shown, respectively, in Figs. 7, 8 and 9 which are sections taken at progressively lower levels in the strut along the respective section lines 7—7, 8—8 and 9—9 of Fig. 6. In actual practice the main struts 26 have basically the section of an NACA (National Advisory Committee on Aeronautics) No. 65–010 section hydrofoil with modified trailing and leading edges as seen in Fig. 37 and whose symmetrical ordinates at opposite sides of the main strut chord in section at various stations in percent of strut chord are set forth in the table of Fig. 37. In addition, the leading edges 26a of the struts 26 are extended to a point that lies 6% ahead of the leading edge end 26b of original chord 26c specified in said table and this point at leading edge 26a is connected by tangents 26d to the profile at the ordinates 26e of the 5% station of the original chord as measured from the leading edge end 26b of the original chord. For example, if the original strut chord were 20" the leading edge would be extended to a point 1.2" in advance of the leading edge end of the original chord and this point would be joined by tangents to the strut section profile at the ordinates of the 5% (1.0") station of the original chord as measured from its original leading edge end. The struts have a section which is smooth and fair and designed to minimize negative pressures.

As appears from the table the maximum strut thickness lies at the 40% station of the original chord. Such maximum strut thickness, according to the table and at said station, has double the value of the ordinate at the 40% station, it being equal in this instance to twice 5.0004%, namely, 10.0008%.

As can be observed form Figs. 6–9 the strut chord shortens in length towards the lowermost ends of the strut 26. In consequence, while the thickness ratio of the strut relative to its chord remains the same and in accord with the table of Fig. 37, nevertheless the actual thicknesses of the strut sections lessens correspondingly with shortening of chord length. This is seen clearly in the profile views of the struts 26 in Fig. 3 as well as in the sectional views thereof in Figs. 7, 8 and 9.

As has been previously stated, the struts 26 are provided with a forward sweep, the purpose of which is to reduce their tendency to entrain air while in motion. In addition, as previously stated, the lower portion of each strut 26 has a greater forward sweep than the upper portion. The purpose of this is to delay the onset of cavitation when the strut is traveling at high speed through water as well as to inhibit air entrainment. This is illustrated diagrammatically in Fig. 6a.

Each strut 26 serves to support three sets or pairs of hydrofoils 30, 31 and 32 arranged in spaced superposed relationship. The lowermost set or pair of hydrofoils 30 is cantilevered from the lowermost end of the strut 26 with each hydrofoil element of the pair extending laterally from an opposite face of the strut 26. The intermediate set or pair of hydrofoils 31 at the level next above the lowermost set 30 is similarly cantilevered from the strut and likewise the uppermost set or pair of hydrofoils 32 is similarly cantilevered and supported from the strut 26. Each of the foil elements of the three hydrofoil pairs has the section shown in detail in Fig. 14. This section is basically that of an NACA (National Advisory Committee on Aeronautics) 65–206 air foil section modified, however, in accordance with the dimensional characteristics set forth in the table of Fig. 15. In the table, stations along the chord are specified in percent of chord length. Likewise the ordinates are specified in percent of chord length at various stations on each side of the chord. It will be observed that the section is not symmetrical relative to the chord.

As seen in Figs. 11, 12 and 13, each hydrofoil element has a 45° sweepback angle. This angle may range from 20° to 50°. As seen in Fig. 10, each hydrofoil element is cantilevered with respect to the main strut 26 at a 30° dihedral angle. This dihedral angle may range from 20 to 40°. Moreover, each foil has a maximum thickness ratio of approximately 6% in the form shown (calculated with respect to length of the chord as 100%). However, the range of thickness ratios is from approximately 4% to 10%. In addition, each of the hydrofoil elements is supported from the main strut 26 with an angle of incidence setting, in relation to the direction of forward motion, of no more than approximately 4° and of more than 0°. In a practical embodiment, the incidence angle of the lowermost set or pair of hydrofoils 30 was 1.25°, that of the intermediate set 31 was 1.75° and that of the uppermost set of 32 was 3.25°. While the range of incidence angles specified may vary, it is known that a limiting value of 4° exists for satisfactory operation for high speed surface piercing foils. The 6% maximum thickness ratio of the foil sections in combination with their 45° sweepback angle and low incidence angle, as well as the modified NACA sectional shape of each of the hydrofoil elements, as exemplified in the table of Fig. 14, are found to permit the elements to travel through water at speeds up to 90 miles per hour without cavitating or entraining air. The sweepback angle, in addition to increasing the speed at which cavitation occurs (cavitation speed) and inhibiting air entrainment, permits the employment of cantilevered foil elements of good hydroelastic properties having only 6% maximum thickness ratio. This improves riding qualities of the craft in rough water.

As will be observed from Figs. 11, 12 and 13, the overall dimensions of the respective sets or pairs of foil elements 30, 31 and 32 differ, the dimensions shown in the three figures indicate that the lowest foil set 30 has the smallest net area and the uppermost foil pair 32 has the greatest net area. The intermediate foil pair 31 has a net area intermediate the areas of the other two foils. The lower foil pair 30 has a net area which is intended to support the maximum load of the craft at its maximum design speed with the tips of such lower pair 30 just breaking the surface of the water in the manner illustrated in Fig. 16. The upper and middle pairs 32 and 31 of hydrofoil elements have an area which in combination with the lower foil area is intended to be sufficient to elevate the hull clear of the water at a lower forward speed of the craft. The purpose of this is to eliminate as much as possible of the drag of the hull and of the foils in accelerating to desired design speeds. In other words, it is intended to prevent drag of the hull and foils from becoming prohibitive at any time during forward motion.

The net areas of the two upper pairs of hydrofoil elements 31 and 32 could be combined in a single pair of elements (not shown) located, for example, in the regions now occupied by the intermediate set 31. A disadvantage of such combination, however, is that the resulting substitute pair must have such large dimensions as to prevent ready retraction of the main struts to an inoperative position above the sequifoils 14. The use, therefore, of three sets or pairs of hydrofoil elements in superposed relationship for one set is preferable from a convenience standpoint. The three hydrofoil pairs are reefing in principle and thus by their variable depth of immersion maintain an equilibrium between the lift they produce with a change in speed.

While, as previously stated, the shape of the section of each of the main hydrofoils is derived basically from an NACA 65–206 airfoil section, also as aforementioned it is modified in accordance with the table of Fig. 15.

The departure from said NACA section, as specified in the table of Fig. 15, is necessary to prevent vibration of the trailing edge when traveling at high speeds. The departure includes elimination of trailing edge cusps of the NACA section by a straight line between the point where the cusp begins and the trailing edge. In addition, as seen in Fig. 14, the trailing edge of each of the hydrofoil elements has a flap 35 added. This flap is provided by projecting the upper surface straight line at the terminal end of the original trailing edge beyond its normal termination point for an extent which is a fixed percentage of the length of the mean aerodynamic chord of the hydrofoil element and joining the terminal end of the projection by a horizontal line to its intersection with the lower surface of the foil. For the main uppermost hydrofoil pair 32, the extent of projection is approximately 20% of the mean aerodynamic chord; for the mid level hydrofoils the extent of projection is approximately 15% of said chord; and for the lower hydrofoils 31 it is approximately 10% of said chord, as is indicated in Fig. 14. These flaps 35 served to provide increased area for a subsequent increase in weight of the craft over the original design weight. In some instances possibly the flaps may be omitted.

The intersection and junction of the respective hydrofoil elements of the three pairs with the strut 26 in each instance is constructed approximately as an ellipsoidal shape or generally streamlined body of revolution 36a, 36b, or 36c, as seen in Fig. 6. The functions of these bodies of revolution are to reduce drag of the intersections during high speed forward motion and in addition to provide means for the mechanical connection to the strut of each pair of the hydrofoil elements. A further feature to be noted is that the connection of the hydrofoil elements to the strut 26 in each instance is such that the maximum point of thickness (in cross section) of each hydrofoil element is well aft of the point of maximum thickness (in cross section) of the main supporting strut 26 at the site of connection. This type of connection of hydrofoil elements and strut is provided for the purposes of preventing the addition of the peak pressures of the strut and of the hydrofoil elements from inciting cavitation.

It is important to note that the hydrofoil bearing main struts 26 are retractable from their operating position at which they project downwardly into the water below their supporting sequifoils, to an inoperative position out of water and above the sequifoils. The mechanical means for operating the struts 26, will be hereinafter described.

A further factor of importance is that the main supporting hydrofoil systems including their struts and hydrofoil elements are carried by the sequifoils 14 in a location that is such that the center of pressure of the hydrofoil elements as illustrated in Fig. 6 is positioned in advance of the center of gravity of the craft by a distance of at least 10% of the average chord of the main supporting hydrofoil elements and not more than approximately 500% of said average chord.

In a practical embodiment of the invention in connection with a 53-foot craft (maximum gross weight 17,000 lbs.) hydrofoil element dimensions of the following approximate order were found desirable. The actual area of the lower hydrofoil pair 30, approximately 5.5 sq. ft. (projected area 4.8 sq. ft.), the actual area of the intermediate pair 31, approximately 8.3 sq. ft. (projected area 7.2 sq. ft.) and the actual area of the upper pair 32, 12.5 sq. ft. (projected area 10.8 sq. ft.). The other approximate dimensions of the foil pair elements are indicated in Figs. 11, 12 and 13.

With respect to the dimensions of the main foil struts 26 and the relative elevational locations of the hydrofoil element pairs thereon, the following were utilized:

Submerged depth of the lower foil pair 30 measured at the strut 26 below dead water level (D.W.L.): approximately 78.9 inches. Distance or elevation of the mid-foil pair 31 measured at the strut above the lowermost foil pair: approximately 16.3 inches. Distance or elevation of the upper foil pair 32 from the mid-foil pair measured at the strut: approximately 17.3 inches. Span between struts 26: approximately 18.35 ft.

The symmetrical cross-sectional shape of the main struts 26 is depicted in Fig. 37 and the table of Fig. 38 indicates the ordinate relation to the chord of the strut at the various stations along the chord as hereinbefore described. The leading edges 26a of the struts are modified in the manner indicated in Fig. 37 by extending them to a point 6% ahead of the original chord provided by the table of Fig. 38. The extension point is joined by tangents to the profile at the ordinates of the 5% station of the original chord in the manner hereinbefore described.

The main struts 26 in the practical 53 ft. craft embodying the invention were weldments of steel heat treated to withstand 150,000 p.s.i. The foil elements of the lower and mid pairs 30 and 31 were of cast stainless steel heat treated to withstand 150,000 p.s.i. The upper pair 32 could be of stainless steel similarly heat treated or of aluminum alloy. Other metallic materials of required strength, corrosion resistance and satisfactory weight requirement can, of course, be utilized in substitution for the materials actually used.

As aforementioned, the incidence angles of the pairs 30, 31 and 32 of hydrofoil elements range from more than 0° to not more than 4°, and specifically the incidence angle of the lowest pair is 1.25°, that of the center pair 1.75° and that of the upper pair 3.25° (Fig. 6). These angles may be varied within the limiting values of 0° and approximately 4° but those depicted and mentioned hereinabove at present are believed preferable.

*The stabilizing tail foil system*

The stabilizing tail foil system is denoted generally by the reference character 40. This system is depicted generally in Figs. 1, 2 and 3 and details of this system are shown in Figs. 17 through 21 inclusive. This stabilizing tail foil system includes a tail strut 41 which in the practical embodiment referred to is a steel weldment and at its bottom has a single pair of hydrofoil elements 42 of, for example, stainless steel cantilevered thereto. These elements 42 are arranged with 0° dihedral angle, have preferably less than 3% thickness ratio, a symmetrical uniform section and have approximately a 45° sweepback angle. The hydrofoil elements 42 are symmetrically disposed projecting from opposite sides of the tail strut 41 at its lower end. In their normal positions when the tail strut 41 projects downwardly in its operative position, the foil elements 42 lie at 0° incidence angle.

As will be described hereinafter, the tail strut 41 is supported at the aft or tail end of the hull so that the angle of incidence of its hydrofoil elements 42 may be controlled to a certain extent by angular manipulation or operation of the tail strut about a transverse hull axis for trimming purposes. The range of variation of incidence angularity is small. This trim control is used only to trim out large center of gravity changes and/or power thrust moments. Once the trim control has been set, for given running conditions it does not have to be changed when speed or sea conditions change during the particular run involved. The tail strut 41 has a forward sweep of approximately the same ranges of angularity as that of the main struts 26 for similar purposes.

The tail strut 41 is supported, in a manner presently to be described, from the tail end of the hull so that it may be retracted around the said transverse hull axis. The attachment further permits pivoting of the tail strut about a longitudinal strut axis and this provides for directional control of the craft. The particular mechanisms for effecting these operations of the tail strut 41 will be hereinafter described.

A feature of importance in this invention is the section of the tail strut. Experimental work has shown that if streamline sections are provided for the strut which are thin enough to prevent a flow separation from occurring when the strut is turned to steer the craft, such sections do not provide sufficient strength to resist the high bending moments caused by the side loads. Experiments have shown further that it is necessary to utilize a tail strut section in the major range of the strut length which has a portion that is essentially ogival from the leading edge to a point of maximum thickness of the strut, and which from the latter has a portion that extends straight aft terminating in a blunt trailing edge. Such tail strut sections are illustrated in Figs. 19 and 20 which, respectively, are transverse tail strut sections taken along the lines 19—19 and 20—20 of Fig. 17. At these elevational levels of the tail strut 41 which lie in the upper half of its length, the section has only the ogival portion 41a and straight portions 41b and blunt trailing edge 41c. Ogival portion 41a extends for from 20–40% of the length of strut chord from its leading edge 41d. Such section shape provides a section thick enough to carry the bending moments without separating the flow during motion of the tail strut through the water.

Experiment shows also that if this ogival type section without modification should continue all the way to the bottom end of the strut, the drag may become prohibitive. To obviate this in the lower portion of the strut, the ogival type section is gradually blended into and replaced by a very thin streamline section (Fig. 21) as it approaches the point where the moments approach zero, i.e., at the attachment point of the tail hydrofoils 42. Fig. 21, which is the section taken along line 21—21 of Fig. 17 is illustrative of the transition from ogival type to streamline type of strut section. It is to be noted that the transition begins to occur below the mid-level of the strut 41 and continues progressively to its bottom end. Moreover, in the region of transition the trailing edge is extended backward at 41e a distance of approximately 15% of the original strut chord.

In the embodiment shown, the tail foil elements 42 which are carried at the lower end of the tail strut 41 are simply flat blades of symmetrical shape welded to the lower end of the strut. These blades have approximately a 45° sweepback angle as shown in Fig. 24 and also the other dimensional characteristics noted in said figure. In the practical embodiment hereinbefore mentioned for which the tail strut assembly above described was constructed, the overall actual area of the pair of foil elements 42 was 6.3 sq. ft. and the foil thickness to chord ratio was approximately 2½%. This ratio may range to approximately 3%.

*Tail foil strut supporting and operating system*

Figs. 17, 18, 25 and 26 illustrate the manner of support and of operation of the tail strut 41 to provide for trim control, and for directional control and also for retraction of the tail foil system 40 about an axis transverse to the hull. As seen in said figures, a shaft-like extension 45 extending in parallelism with the longitudinal axis of the strut is provided at the upper end of strut 41. This shaft-like extension 45, as seen in Figs. 25 and 26, is mounted rotatively within a tubular socket 46 which latter in turn is mounted on a bracket 47. The bracket 47 is pivotally supported at 48 from appropriate frame parts 49 lying within the aft end of the hull 10 and so disposed that the bracket 47 is rotatable about a horizontal axis which is transverse to the longitudinal axis of the hull 10. The strut extension 45 projects through the socket 46 and outwardly beyond its upper end whereat it is provided with a fixed laterally extending crank 50. A push-pull tube 51, preferably of steel or other rigid material is secured by a universal joint at 52 to the crank 50. The forward end of the tube (not shown) is connected in conventional manner through a bell crank and worm gear arrangement (not shown) to the steering wheel (not shown), of the craft.

Push and pull movements imparted to the tube 51 by operation of the steering wheel thus provide swiveling action of the strut 41 about its longitudinal axis, thereby providing directional control for the craft because of the rudder action of the tail strut 41 when swivelled in such manner.

Retractive swinging operation of the strut 41 about the horizontal axis defined by the pivots 48 of the bracket 47 is effected conveniently by a hand-operated cable winch (not shown) and a cable 54 extending around a drum 55 which latter is secured to the bracket 47. Conventional operation of the winch thus causes the cable 54 to wind or unwind around the drum 55. This rotates the bracket 47 and with it the tail strut 41 about the horizontal axis, defined by pivots 48. With this arrangement, the strut 41 may be rotated on the pivots 48 from its operative position shown in Fig. 25 to a retracted or inoperative position as indicated in dotted lines in Fig. 1.

The tubular socket 46 is provided with two forwardly extending locking ears 57 which may be mechanically coupled to the outer end 59 of a screw jack element 60 by movable locking pins 61 (Fig. 25a) actuated through linkages 62 by a hydraulic cylinder plunger 63. The plunger 63 is operated by pressure cylinder 63a which in turn is supported by a bracket 64 which is an integral part of the end 59 of screw jack element 60.

The screw jack casing 65 is supported within the aft portion of the hull for rotation about an axis extending parallel with the longitudinal axis of the hull. Rotation in clockwise or counterclockwise direction serves to advance or retract the jack portion 60 relative to its casing 65. The extent of advance or retraction need not be large since the sole function of such movements is to provide trim adjustment of the tail foil system of the order of not more than approximately a degree or two. In actual practice, in fact, trim angle changes of the order of ⅛ of a degree will have marked effects. Accordingly, the angular range for change of trim need not be more than a few degrees at the most.

Rotation of the jack casing 65 to advance or retract the jack part 60 may be conveniently effected by a worm gear 69 and a worm wheel 70 coupled thereto. The worm wheel 70 may be rotated by an endless cable 71 wrapped about a drum 72 coaxially mounted with the worm wheel 70 and rigidly coupled thereto. Any other convenient way of rotating the worm wheel 70 from a point of remote control may be utilized.

For trim control action, the coupling pins 61 must engage both the coupling ears 57 and the end 59 of the screw jack element 60. When retractive operation of the strut 41 is desired, the coupling pins 61 must be released from their engagement with the ears 57.

With the arrangements described, it is possible therefore to manipulate the tail strut 41 to provide directional control for the craft. It is also possible to provide small angular trim movement of the strut while in its operative position for trim control. It is also possible to retract the strut from an operative position wherein it extends downwardly into an inoperative position wherein it overlies the upper surfaces at the tail or aft end of the hull.

It is to be understood, of course, that the particular mechanisms described for effecting the foregoing manipulative movement of the tail strut 41 are merely exemplary. Any effective mechanical systems producing like results can be substituted.

*The main strut retracting mechanism*

The main hydrofoil supporting struts 26, each of which is pivoted for rotation about an axis 27, as hereinbefore described, are movable from their operative generally downwardly extending positions shown in Figs. 1, 2 and 27 into a retracted or inoperative position overlying the upper surfaces of the sequifoils 14. Any conventional arrangement for effecting such retractive movement may be employed. By way of example, as seen in Fig. 27, each strut 26 is provided with a crank 90 fixed thereto. Each such crank 90 is coupled as by a link 91 to a cam 92. Each cam 92 is coupled also by a link 93 to a fixed hull supported pivot 94. The cam 92 has a slot 95 in which a pivoted joint 96 between links 91 and 93 is movable. This cam 92 is secured at the end of a piston rod 97 which latter is reciprocally movable inwardly and outwardly of a pressure cylinder 98 into which pressure fluid may be introduced at either end. Outward thrust of the piston rod 97 through the interaction of the cam 92 and the links 91 and 93 on crank 90 causes a swiveling rotation of the corresponding strut 26 from the full line position of Fig. 27 to the position shown in dotted outline therein. Retractive motion in the opposite direction restores the strut 26 to its full line position. The full line position of the strut 26 is its normal operative position.

To prevent accidental displacement from the latter position a pressure cylinder actuated locking pin 100 is movable into and out of engagement within a recess 101 provided within the strut 26. When the locking pin 100 is fully engaged within the recess 101, the strut 26 is locked against rotation about its axis 27. It is necessary to withdraw the pin 100 by appropriate energization of its controlling pressure cylinder 103 in order to free the strut 26 for retractive motion under the action of pressure fluid supplied to the pressure cylinder 98. While this specific mechanism has been found suitable, it is to be understood that other similarly effective mechanical systems may be substituted. The one described is merely by way of an operative example.

The operative arrangements for manipulating the tail strut 41 and the main struts 26 to retractive positions are important because they facilitate inspection of the hydrofoil elements of the tail and main supporting foil systems while the craft is afloat, it being merely necessary to operate the desired retraction mechanism described to move the selected hydrofoil system to a retracted position out of the water. Operation of all the retractive mechanisms permits retraction of all the foil systems to out of water positions so that the craft may be operated merely as a boat in shallow waters or to clear submerged obstacles which could not otherwise be cleared with the foil systems in operative positions.

*Propulsion system*

The propulsion system for the craft of this invention in the practical embodiment hereinbefore mentioned comprised a pair of Pratt & Whitney R-985 Wasp, Jr. engines developing 450 H.P. each. These engines designated by the reference character 105 in Figs. 1-4 inc. are supported by stanchions 106 carried by the transverse box beam 15. These stanchions support the engines 105 at elevated positions over the upper surfaces of the respective sequifoils 14.

The propellers or air screws 107 driven by the engines found preferable were steel two bladed propellers 8'4" in diameter and of controllable pitch. Propellers of this type are available as products of the Aeroproducts Corp., Division of General Motors Corporation, being identified as Model A-322 with N 20 blades. While these propellers were found suitable, other propellers providing comparable thrust and erosion resistance can, of course, be substituted.

*Modifications of main supporting hydrofoil systems (Figs. 35 and 36)*

In the practical embodiment of the invention hereinabove described the main supporting hydrofoil systems 25 each comprises three sets or pairs 30, 31 and 32 of hydrofoil elements supported from a main strut 26. In some conditions as seen in Fig. 35 and usually for craft of smaller dimensions than the 53 ft. craft above-mentioned, hydrofoil systems 125 may be substituted. In the latter the three sets or pairs of hydrofoil elements 30, 31 and 32 of the system 25 supported from a main strut 26 are replaced by a single pair of hydrofoil elements 130 disposed at the foot of each main strut 126. These main struts 126 are positioned at the outer ends of sequifoils 114 and are supported thereat in the same retractable manner as are main struts 26. The sections of the main struts 126 as well as the sections of the individual hydrofoil elements of the pair 130 are like those of their respective counterparts 26 and 30 in the aforementioned practical embodiment. Areas of the hydrofoil elements of the single pair 130 will be larger than the areas of individual hydrofoil elements when they are arranged in superposed pairs. The net area of the elements of a single pair 130 will depend upon the full load desired to be lifted clear of the water at running speed.

In the embodiment of Fig. 35 the tail foil system 140 in structure and arrangement is substantially identical with that of the hereinbefore described practical embodiment, its strut 141 being supported from the aft end of the hull 110 in identical manner to the support of tail strut 41 of the earlier described embodiment. Direction and trim control of the tail foil system 141 are accomplished in the same way. The tail strut 141 has the sectional shape of tail strut 41 and the tail foil elements 142 supported thereby are identical in shape and in disposition as their counterparts 42 of said earlier described modification.

In some instances, as seen in Fig. 36, the two main hydrofoil systems 125 of Fig. 35, one suspended from each of the sequifoils 114, may be replaced by a single main supporting hydrofoil system 225 which is centralized below the hull. Three main supporting struts 226 are provided in this instance for supporting the hydrofoil element pair 230 below the hull 210 and below sequifoils 214. The sections of the struts 226 correspond with that of struts 26. Likewise, the section of the hydrofoil elements of the pair 230 corresponds with that of the pair 30 of the first described element.

The tail foil system 240 and its components are the same in structure and shape as those of the tail foil system 40 of the first described embodiment. In the embodiment of Fig. 36 the net area of the main supporting hydrofoil element pair 230 will be approximately the sum of the net areas of the two pairs 130 of Fig. 35 for a craft of like size and load as that of Fig. 35. Other areas will, of course, be required for differently sized and loaded craft.

*Summary*

From the foregoing detailed description, it appears that structural features involved in the craft of this invention are a tube-like hull 10 which is stressed to resist local bottom loads as well as overall bending moments imposed by the hull striking a wave during forward motion. The hull's upward and rotational motion are restrained by the action of inertia forces and forces created by the hydrofoil systems 25 and 40. The hull is also stressed to take the torsional and side bending moments occurring during turning. The sequifoils 14 prevent the hull from rolling over when at rest in the water. They also resist local bottom loads and torsional loads imparted by the thrust and drag moments. The main box beam 15 running transversely through the sequifoils 14 and the hull 10, together with the auxiliary leading edge beams 17 are also important. The box beam 15 absorbs vertical inertia loads of the power plant, e.g., the aircraft engines 105 and also of the main supporting foil systems 25. The box beam also absorbs static and dynamic vertical loads imposed by the main foil systems 25 during operation.

In constructing the hull and the hydrofoil systems, particularly the main hydrofoil supporting systems 25, arrangements are made to locate the parts so that the general distribution of weights and forces in the craft is such that the center of pressure of the main supporting foil systems 25 lies ahead of the center of gravity of the craft as a whole by a distance of at least 10% of the average chord of the main supporting hydrofoil elements and not more than a distance of 500% of said average chord. In addition, the distance between the center of pressure of the main supporting hydrofoil systems 25 and the center of pressure of the tail stabilizing foil system must be greater than 1000% of the average chord of the main supporting hydrofoil elements. The greater this latter distance the better from a standpoint of dynamic longitudinal stability.

By a combination of critical angles, proportions parameters and shapes of hydrofoil elements, struts and other parts and by distribution of weights and forces in the manner outlined, the craft has a degree of dynamic longitudinal stability such that if a forcing function is applied to the craft, the induced oscillation will dampen to ½ amplitude in less than one cycle. Experimental experience indicates that such a degree of stability is very desirable for safety and comfort.

As mentioned above, a complete craft embodying the features hereinbefore described has actually been constructed and tested thoroughly. This craft is 53 feet in length and is statically and dynamically stable about all three axes. It has been tested for a speed range of zero to 65 miles per hour under sea conditions ranging from flat calm to 3'-4' x 50'-75' waves. The $L/D$ (lift to drag) ratio is about 7 at 65 m.p.h. In addition, a maximum speed over a measured course in excess of 75 miles per hour has been attained in calm water. In the test craft, the main supporting hydrofoil system elements hereinbefore described had the sections and dimensions indicated in the drawings and also hereinabove recited. Likewise, the tail foil system had the structure and the dimensions hereinabove described and shown in the drawings. The dry weight of the completed vehicle was approximately 13,320 pounds and its maximum gross weight 17,000 pounds. The power was furnished by the two air cooled 450 H.P. aircraft engines 105 provided with steel propeller blades 107 each 8' 4" in diameter as hereinabove specified.

Tail foil systems utilizing hydrofoil elements arranged on the tail strut in a superposed relationship in a manner similar to that of the elements of the main supporting hydrofoil systems and with dihedral and incidence angles of comparable magnitude and with symmetrical sections were tried in connection with the 53 ft. craft hereinbefore described. These systems did not provide a craft with the directional, longitudinal and lateral stability essential for high speed operation. Problems encountered with such tail foil arrangements were violent yaw, inability to achieve desired speed, increased drag, stall, longitudinal oscillation, directional instability, air entrainment and other undesirable factors. The specific tail foil system herein described, however, remedied the problems when utilized with the main foil systems hereindescribed. The structural and dimensional features of the herein described tail foil system 40 and of the main supporting foil systems 25, 125 or 225 are intimately interrelated in producing the stable efficient high speed craft of this invention.

The craft at different speeds had remarkable turning properties. During turning there was no experience of unsafe conditions or feelings.

As will be observed from Fig. 3, the hull is lifted above the water surface at various speeds to the extent indicated therein.

While specific embodiments of the invention have been disclosed, variations in structural detail within the scope of the appended claims are possible and are contemplated. There is no intention of limitation to the exact details shown and described.

What is claimed is:

1. Craft of the character described including in combination: a hull; a main hydrofoil system connected to said hull and positioned for supporting above water most of the weight of said hull in response to substantially horizontal movement of the hydrofoil system through the water, said main supporting hydrofoil system being constructed for area stabilization or reefing operation due to the conformation inherent therein, said main hydrofoil system having at least two portions extending in a direction substantially laterally relative to the center line of said hull, such portions having upwardly inclined faces and being disposed at a selected angle of dihedral, and which upwardly inclined faces are adapted to be immersed in the water to a degree which varies as a function of the velocity of the craft relative to the water; and a stabilizing hydrofoil system connected to said hull and spaced longitudinally from said main hydrofoil system, such stabilizing hydrofoil system being conformed for remaining constantly submerged in response to substantially horizontal movement thereof relative to the water and being free of such inherent area stabilization conformation above defined, the center of pressure of said two hydrofoil systems being located substantially along a fore and aft line of such craft with the center of gravity of the craft located therebetween.

2. Craft in accordance with claim 1 characterized in that the center of pressure of said main hydrofoil system is located forward of the center of gravity of the craft, and the center of pressure of said stabilizing hydrofoil system is located aft of such center of gravity.

3. Craft in accordance with claim 1 characterized in that to such hull are connected the main hydrofoil system, said main hydrofoil system including two subsystems, one being secured to one side of the hull and the other subsystem secured to the other side of the hull and thereby being laterally spaced from one another as separate entities.

4. Craft in accordance with claim 1 characterized in that said main hydrofoil system includes hydrofoil elements arranged at a fixed incidence angle of from 0° to approximately 4° with a fixed sweepback angle of approximately from 20° to 50°, and a fixed dihedral angle of from approximately 20° to 40°, and having a fixed thickness ratio of approximately 4 to 10%.

5. Craft in accordance with claim 1 characterized in that said main hydrofoil system includes a plurality of individual hydrofoil elements and a plurality of supporting struts for said elements.

6. Craft in accordance with claim 1 characterized in that said main hydrofoil system is located forward of the center of gravity of the hull by a distance of at least 10% of the average length of a main hydrofoil chord.

7. Craft in accordance with claim 1 characterized in that central supporting strut means are provided for the hydrofoil elements of the main hydrofoil system and are conformed with a forward sweep relative to the vertical, the forward sweep angle being greater than 0° but not greater than 20° to the vertical.

8. Craft in accordance with claim 1 characterized in that the stabilizing hydrofoil system includes: a single tail strut, a hydrofoil element having substantially 0° dihedral angle supported by said single strut, and means for adjusting the incidence angle of the latter hydrofoil element for the purpose of eliminating thrust moments detrimental to the stability of the craft and due to the power means for propelling same and also for eliminating moments due to changes in center of gravity of the craft.

9. Craft in accordance with claim 8 characterized in that means are provided for mounting said single tail strut for angular movement both about a substantially upstanding and a transverse axis thereby to provide directional control for the craft and to facilitate the maintenance of static and dynamic longitudinal stability thereof.

10. Craft in accordance with claim 1 and including means for retracting the stabilizing foil system to an inoperative position about an axis transverse to the longitudinal axis of the craft.

11. Craft in accordance with claim 1 characterized in that said main hydrofoil system includes downwardly disposed forward sweeping main struts, hydrofoil elements arranged in superposed relationship on said main struts, said hydrofoil elements having sweepback angles of approximately 45°, dihedral angles of approximately 30° and having an incidence angle setting of more than 0° and not more than approximately 4°, said foils each having a maximum thickness in section of approximately 6% of its chord, all of said elements being inherently area stabilizing in principle, and said struts each having a maximum thickness in section of approximately 10% of its original chord, said hydrofoil elements each being connected to a strut so that the maximum point of thickness of each such hydrofoil element is well spaced from the point of maximum thickness of the strut at the connection to prevent addition of peak pressures of strut and hydrofoil elements from inciting cavitation.

12. Craft in accordance with claim 1 characterized in that said stabilizing foil system includes a single tail strut supported well aft of the center of gravity of the hull and extending downwardly with a forward sweep, a single stabilizing hydrofoil element supported with symmetrical disposition at the lowermost end of said tail strut, said element having 0° dihedral angle, a section at approximately a 45° sweepback angle, said tail strut having a section in the major portion of its length that is substantially ogival from its leading edge to a point of maximum thickness and which from thence extends straight aft and terminates in a blunt trailing edge, said section in the lower region of the strut as it approaches the hydrofoil element being gradually blended into a very thin streamlined section.

13. In a dynamically supported water craft, including in combination: a hull which is adapted to rise clear of the water; a dynamic sustaining system for such hull comprising: a main hydrofoil system connected to said hull and located such that the upwardly directed resultant force of said main hydrofoil system, which force arises in response to substantially horizontal movement thereof relative to the water, is located near the center of gravity of the craft so as to lift the major portion of the weight of the craft, said main hydrofoil system being constructed for area stabilization due to the conformation inherent therein, said main hydrofoil system having at least two portions which extend substantially laterally of the hull and which have upwardly inclined faces disposed at a selected angle of dihedral, said main hydrofoil system being free of continuous control of angle of incidence; and a stabilizing hydrofoil system connected to and spaced below the hull and located such that the upwardly directed resultant force which arises as a result of substantially horizontal movement thereof relative to the water is longitudinally spaced from such resultant of the main hydrofoil system so as to carry a small amount of the weight of the craft, such stabilizing hydrofoil system being conformed to remain constantly submerged in response to such movement thereof relative to the water and being free of the inherent area stabilization conformation of said main hydrofoil system, the center of pressure of said two hydrofoil systems being located substantially along a fore and aft line of such craft with the center of gravity of the craft located therebetween.

14. Craft of the character described including in combination, a hull, an area stabilizing hydrofoil system connected to and depending from said hull and provided with hydrofoil elements, the center of pressure of said hydrofoil system being spaced longitudinally from the center of gravity of the craft a distance of between 10 percent and 500 percent of the average chord of the hydrofoil elements of said system, and a continuously submerged hydrofoil system connected to and depending from said hull and spaced longitudinally from said first hydrofoil system, the center of gravity of said craft being located between the center of pressures of said two hydrofoil systems.

15. Craft in accordance with claim 14 characterized in that the center of pressure of said second hydrofoil system is spaced from the center of pressure of said first hydrofoil system a distance of at least 1,000 percent of the average chord of the hydrofoil elements of said first hydrofoil system.

16. Craft in accordance with claim 14 characterized in that the hydrofoil elements of said first hydrofoil system are arranged with a fixed sweepback angle of from approximately 20° to 50°, a fixed dihedral angle of from approximately 20° to 40° and a fixed incidence angle of from approximately 0° to 4°.

17. Craft in accordance with claim 14 characterized in that the hydrofoil elements of said first hydrofoil system are in spaced superposed relationship and are provided with fixed incidence angles within the range of approximately 0° to 4°, the lowermost of said elements being set at an incidence angle within the lower half of said range and the uppermost of said elements being set at an incidence angle within the upper half of said range.

References Cited in the file of this patent

UNITED STATES PATENTS

| 767,827 | Noll | Aug. 16, 1904 |
| 2,073,438 | Adams | Mar. 9, 1937 |
| 2,139,303 | Greg | Dec. 6, 1938 |
| 2,257,406 | Burtenback | Sept. 30, 1941 |
| 2,344,619 | Lake | Mar. 21, 1944 |
| 2,708,894 | Hook | May 24, 1955 |
| 2,749,869 | Bush | June 12, 1956 |
| 2,749,871 | Scherer et al. | June 12, 1956 |
| 2,753,135 | Gouge | July 3, 1956 |
| 2,771,051 | Schertel | Nov. 20, 1956 |
| 2,795,202 | Hook | June 11, 1957 |

FOREIGN PATENTS

| 422,982 | Great Britain | Jan. 23, 1935 |
| 458,111 | Great Britain | Dec. 14, 1936 |
| 959,264 | France | Sept. 26, 1949 |